Oct. 30, 1962     D. HIJMANS     3,060,950
BUFFER VESSEL WITH CONTROLLED BY-PASS AND METHOD OF OPERATING SAME
Filed Nov. 23, 1959     2 Sheets-Sheet 1

INVENTOR:
DIRK HIJMANS
BY *Oswald H. Milmore*
HIS ATTORNEY

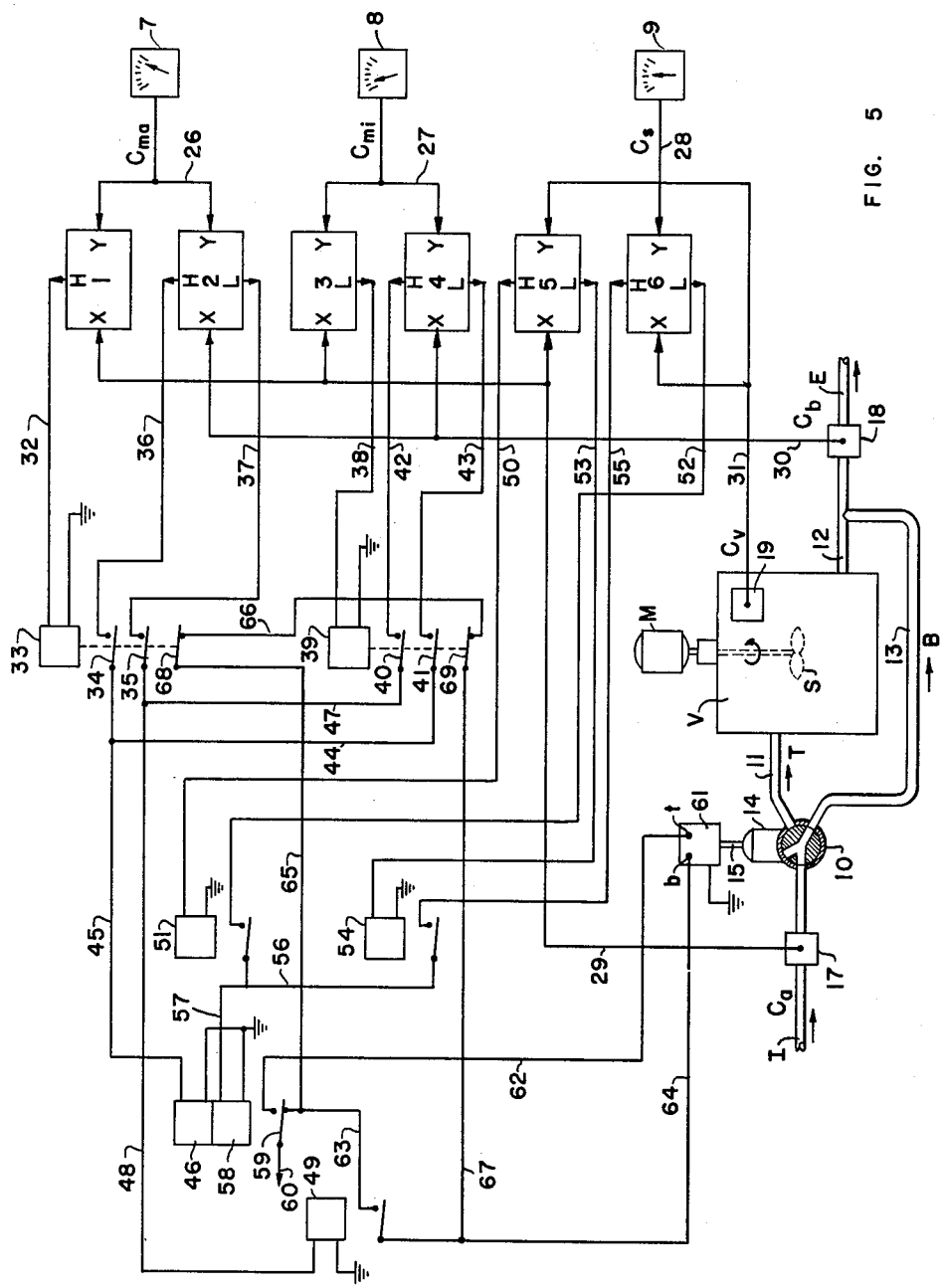

United States Patent Office 3,060,950
Patented Oct. 30, 1962

3,060,950
BUFFER VESSEL WITH CONTROLLED BY-PASS AND METHOD OF OPERATING SAME
Dirk Hijmans, The Hague, Netherlands, assignor to Shell Oil Company, a corporation of Delaware
Filed Nov. 23, 1959, Ser. No. 854,901
Claims priority, application Belgium Dec. 27, 1958
10 Claims. (Cl. 137—3)

This invention relates to improvements in buffer vessels, sometimes known as surge tanks, through which a fluid stream is passed to eliminate extreme fluctuations in a condition, such as composition or temperature, whereby the required volume of the buffer vessel is reduced, and to a method of operating such a buffer vessel by selectively by-passing the stream around the buffer vessel so as to permit the use of a buffer vessel having a smaller volume.

Streams of materials exhibiting fluctuations in a condition, such as composition or temperature, are often encountered in technological practice. In many cases these fluctuations must be kept within specified limits, as when a stream produced in one unit is further treated or reacted chemically in a subsequent unit, or in blending streams. Such control is necessary, for example, in order to safeguard the subsequent apparatus in which the stream of material is processed, or to permit the manufacture of a product of a desired quality. If the fluctuations of the conditions of the available stream of material are inadmissibly high, they may be reduced by passing the stream constantly through a buffer comprising one or a series of vessels; the buffer effluent then has a composition or temperature which never differs as much from the average composition or temperature of the source stream as do the instantaneous conditions of the said source stream provided, of course, that the buffer has a capacity which is sufficiently large. The minimum buffer capacity required in any particular case can be calculated from the anticipated magnitude and duration of the fluctuations in the condition of the available feed stream, the magnitude of the maximum permissible fluctuations in said conditions of the effluent stream, the size of the stream, and the degree of mixing occurring within the buffer vessel. In many cases, even when an ideal (perfect) mixing is assumed to occur in the buffer vessel, the required buffer volume is found to be very large, resulting in high capital cost for installing the buffer, especially when corrosion-resistant materials are required, and further causing large hold-up which is undesirable in certain situations.

It is an object of this invention to provide an improved buffer system through which a source stream of material is flowed to reduce fluctuations in a condition thereof, said system including a buffer vessel, a by-pass conduit for passing said stream around the said vessel, and control means for directing said source stream either through said buffer vessel or through said by-pass conduit in accordance with the conditions prevailing at any moment in the source stream and in the material with the buffer vessel so as to permit a smaller buffer vessel to be used.

A further object is to provide an improved method of smoothing out fluctuations in a condition prevailing in a source stream of material by flowing the stream through a buffer vessel when certain conditions prevail in the source stream and in the material within the buffer vessel, in a manner to permit a smaller buffer vessel to be used.

In accordance with the invention, it was found that fluctuations in the composition or temperature of a source stream of material can be equalized with a buffer vessel of considerably smaller volume than was hitherto required by by-passing all or part of the said stream around the bufffer vessel, and passing the said stream through the buffer vessel only as required for (a) producing an equalized effluent stream the composition or temperature of which falls within predetermined limits and (b) bringing the composition or temperature of the material within the buffer vessel closer to a desired value, herein called the standard condition.

Inasmuch as an understanding of the conditions under which the source stream is by-passed and a judicious determination of the optimum fractional part of the source stream which are passed through and around the buffer vessel requires an appreciation of what occurs in a buffer vessel, the description will be prefaced by an explanation of the principles involved.

If the composition (wherever "composition" is used hereinafter, it is used generically to signify a condition of the material, so that "temperature" may also be constantly read) of an available source stream of material the whole of which is passed continuously through a buffer vessel temporarily exceeds the limits set for the effluent stream, and if the buffer vessel is filled with material having a composition within the said limits, the composition of the contents of the buffer vessel and, hence, also of the equalized stream leaving the vessel (assuming effective stirring or other mixing therein) will at first remain within these limits for some time and will, thereafter, exceed one of these limits and approach the composition of the source stream.

It is, however, in accordance with this invention possible to pass only a part of the available source stream through the buffer vessel and to lead the remainder around it in such proportions that the composition of the effluent stream, formed by combining the stream discharged from the buffer vessel (equal in size to that passed into the vessel) and the part of the source stream passed around it, is just within the limits set for the composition. The said total effluent stream is herein called the equalized stream. Since only a part of the source stream material, and not the whole, is passed through the buffer vessel, it will now take longer for the composition of the contents of the buffer vessel to exceed the limits set. On the other hand, if it is required that this period should have the same duration as when (following prior art practice) the whole of the source stream is passed through, a buffer vessel having a smaller volume will be sufficient. The foregoing described flow through the buffer vessel for purpose (a) of the above summary of the invention.

It is evident that the duration of the period in which the buffer vessel is effective to maintain the equalized stream within the limits set is further influenced by the initial composition within the buffer vessel. Thus, if the composition of the source stream exceeds the upper limit set, it will be possible to keep the composition of the equalized stream within the limits set for progressively longer periods as the composition of the buffer vessel was nearer the lower limit at the time that the upper limit was exceeded by the source stream. Conversely, if the composition of the source stream exceeds the lower limit set, the composition of the equalized stream can be kept within the limits set for progressively longer periods as the composition of the buffer vessel was nearer the upper limit at the time the lower limit was exceeded. If the composition of the source stream fluctuates in such a manner that it is able to exceed both the upper and lower limits set and if the number, durations and magnitudes of the fluctuations are the same in both directions, there is a maximum likelihood of reducing the fluctuations in the equalized stream for the greatest period if the buffer vessel content initially has a composition which is exactly midway between the said limits. Such an optimum composition, which it is desired to maintain in the buffer vessel for greatest effectiveness, is herein called the standard composition or condition.

Should, however, the composition of the source stream be unable to exceed one of the two limits set (as when one limit is zero), the equalizing capability of the buffer vessel is at its maximum when its standard composition corresponds to the said unexceedable limit.

It is, therefore, possible to select a standard composition for the buffer vessel contents in accordance with the nature of the fluctuations encountered or the probabilities of certain fluctuations for any particular plant use.

The flow through the buffer vessel for the purpose (b) of the above summary of the invention involves flow of the source stream through the buffer vessel whenever such flow will tend to bring the composition of the contents of the buffer vessel closer to the established standard composition.

If, as is usual in the prior art practice, the source stream of material is always passed entirely through the buffer vessel, it can frequently occur, for example, if the composition of the source stream for a long period is close to but just within one of the limits set, that the composition of the material within said vessel also becomes close to the said limit. If, thereafter, the composition of the source stream exceeds the said limit, the equalizing power of the buffer vessel will be slight, owing to its unfavorable initial composition. However when, in accordance with the invention, the source stream is not passed through the buffer vessel continuously, but only on those occasions that the composition of the contents of the buffer vessel is thereby made to approach the standard composition, the equalizing capability of the vessel is increased considerably. The source stream may, on these occasions, be passed in whole or in part through the buffer vessel. It will be noted that this improvement, due to not always passing through the buffer vessel a source stream having a composition which falls within the set limits is distinct from that considered previously as due to passing through the buffer vessel only a fractional part of the source stream when the said stream composition exceeds one of the limits set.

The criteria for controlling the flow of the source stream may now be stated as follows: According to the invention fluctuations occurring in the composition or temperature of a source stream are equalized with the aid of a buffer vessel having a by-pass so that the composition or the temperature of the equalized stream remains within set limits and the composition or temperature of the contents of the buffer vessel is made to approach a predetermined standard value which is chosen as previously stated and is also within the said limits. To this end, the following measures are taken:

(1) When the composition or temperature of the source stream of material is outside the limits set, a part of this stream is led through the buffer vessel and the remainder is by-passed around it, the ratio of the quantities of the partial streams being such that the composition or temperature of the equalized stream resulting from the combination of the streams issuing from the said vessel and by-passed around it is at the limit which was exceeded.

(2) When the composition or temperature of the source stream of material is within the limits set it is passed through the buffer vessel either in part or entirely, preferably the latter, if as a result thereof the composition or temperature of the buffer vessel contents approach the standard composition or temperature.

(3) When the composition or temperature of the source stream of material is within the limits it is by-passed entirely around the buffer vessel if as a result of passage of said material through the buffer vessel the composition or temperature of the buffer vessel contents would be made to deviate from the standard composition.

It is evident that neither the second nor the third rule governs the trivial case in which the composition or temperature of the source stream exactly equals that of the buffer vessel contents and lies within the limits set. This condition is usually transitory and it is of no consequence whether the stream is by-passed or passed through the vessel.

The invention will be described further with reference to the accompanying drawing forming a part of this specification and showing certain illustrative embodiments, wherein:

FIGURE 5 is a diagram showing an alternative control device for the buffer system according to the invention.

Figure 1:
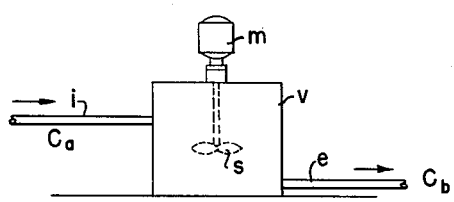
FIGURE 1 is a diagram showing the prior art flow of a stream through a buffer vessel.

In the drawings, FIGURE 1 shows the conventional, prior method of using a buffer vessel, in which a source stream of fluid material, e.g. a liquid, having a composition $C_a$, supplied through an inlet pipe $i$ is flowed through a buffer vessel $v$ and an equalized stream having a composition $C_b$ is discharged through the pipe $e$. The vessel $v$ is filled with the liquid, which is kept mixed to insure a uniform composition by means of a stirrer $s$ driven by a motor $m$.

Figure 3:
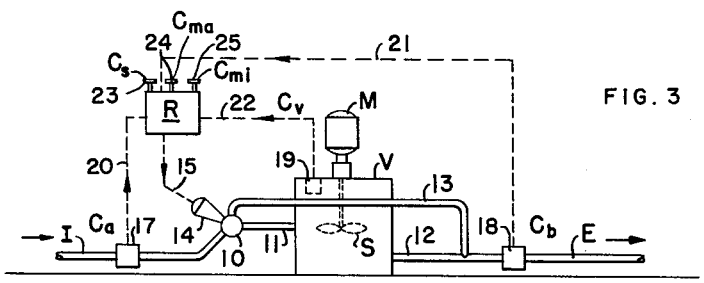
FIGURE 3 is a diagram of a buffer system according to the invention.

FIGURE 3 shows the arrangement according to the instant invention, wherein the source stream of a fluid material, also at a composition $C_a$, is supplied via an inlet pipe I connected to a three-way diversion valve 10 by which all or any desired fractional part of the stream can be passed via a through-flow pipe 11 through the buffer vessel V. This is also provided with a stirring device S driven by a motor M, and is filled. Fluid is discharged through a pipe 12. The valve 10 is also connected to a by-pass pipe 13, to which all or any desired fractional part of the source stream may be passed; this pipe is joined to the pipe 13 and the combined, equalized streams are discharged through the pipe E. The valve 10 may be operated manually or by a valve operator 14 in accordance with a control signal, e.g., pneumatic pressure, transmitted via a control duct 15 from a regulator R. 17, 18 and 19 represent measuring devices for measuring the compositions or temperatures $C_a$, $C_b$ and $C_v$ of the source stream, the equalized effluent stream, and the material within the vessel, respectively. These measurements may be continuous or intermittent, in accordance with the condition measured. The measuring devices emit signals indicative of the measured values e.g., voltages or series of pulses, the numbers or frequency of which varies with the measured value, and transmit them via lines 20, 21 and 22, respectively, to a regulating unit R. This unit further has a manually settable control knob 23 by which the value of $C_s$, the optimum standard composition or temperature of the contents of the vessel V, may be set, and a pair of manually settable knobs 24 and 25 by which the values of $C_{ma}$ and $C_{mb}$, the maximum and minimum limits set for the equalized stream, respectively, are set. The regulator R compares the input signals and generates the control signal for the duct 15. This signal is generated so as to effect a setting of the valve 10 which causes the source stream to flow in the manner previously stated and further considered below. The regulator R may, for example, be constructed as subsequently described herein in connection with FIGURE 5; however, the invention is not restricted to this specific arrangement and the valve 10 may be set manually by observing the signals on indicators by following the instructions given below. Manual operation is feasible when the composition or temperature does change rapidly.

The position of the valve 10 can be described by a particular value of F, which represents the fractional part of the source stream which flows via the pipe 11 through the buffer vessel; F varies between 0 and 1. The position of this valve is controlled according to the scheme shown in the following table, which also shows the $C_b$, composition or temperature for the equalized stream when the valve is set according to the invention:

| Situation No. | Relations Prevailing | | | $C_b$ | F |
|---|---|---|---|---|---|
| 1 | $C_a > C_{ma}$ (a) | | | $C_{ma}$ | $\dfrac{C_a - C_{ma}}{C_a - C_v}$ |
| 2 | $C_a < C_{mi}$ (a) | | | $C_{mi}$ | $\dfrac{C_{mi} - C_a}{C_v - C_a}$ |
| 3 | $C_{mi} < C_a < C_{ma}$ | $C_a > C_v$ | $C_v > C_s$ | $C_a$ | 0 |
| 4 | $C_{mi} < C_a < C_{ma}$ | $C_a > C_v$ | $C_v < C_s$ | $C_v$ | 1 |
| 5 | $C_{mi} < C_a < C_{ma}$ | $C_a < C_v$ | $C_v > C_s$ | $C_v$ | 1 |
| 6 | $C_{mi} < C_a < C_{ma}$ | $C_a < C_v$ | $C_v < C_s$ | $C_a$ | 0 |

Note (a): In the first two situations the relationships between $C_a$ and $C_v$ and $C_s$ are not used. If $C_a$ is constant F increases linearly.

*Example*

The advantages in the method according to the invention will be demonstrated with reference to a simple example wherein a source stream of liquid is supplied at the rate of 10 cubic meters per minute and is produced in a catalytic chemical reactor wherein the catalyst becomes exhausted after 8 hours, necessitating switching to another reactor. As a result of this switch-over the source stream acquires a solute A which is herein, for simplicity, assumed to vary according to a step function shown by the chain lines marked $C_a$ in FIGURES 2 and 4, viz., as follows: The concentration is zero up to zero time, when the new reactor is switched in, at which instant it rises suddenly to 1.5% and continues there for 27 minutes; it is 3% for the next ten minutes; 1.5% for the next 27 minutes; and falls again to zero at the end of the 64th minute. It is further assumed that the value of $C_v$, the concentration of the solute in the liquid within the vessel, was zero at time zero, as a result of several hours prior operation with $C_a$ at zero; and that the equalized stream is fed continuously, at the same rate of 10 cubic meters per minute, to a subsequent plant unit, such as a distilling column or chemical reactor, which can tolerate up to 2% of the solute A in its feed stream but becomes disturbed when 2% is exceeded. In this instance, therefore, $C_{ma}$ is 2%, as shown by the horizontal dotted lines, and $C_{mi}$ and $C_s$ are both zero; hence situations 2, 4 and 6 of the foregoing table cannot occur in this simplified example.

Figure 2:
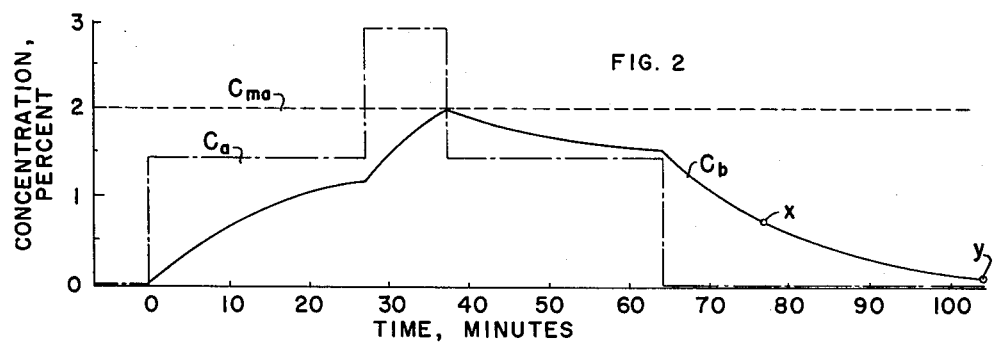
FIGURE 2 is a graph showing the behavior of the system of FIGURE 1.

When the source stream is passed continuously and entirely through the buffer vessel, in accordance with the prior art practice shown in FIGURE 1, the buffer vessel must have a capacity of at least 170 cubic meters, assuming the stirrer S to achieve ideal mixing. The resulting composition of $C_b$ of the equalized stream is shown in FIGURE 2 by the solid line, which also shows the composition $C_v$. It is seen that the concentration of A in $C_b$ and $C_v$ is still 0.75% at time $t=77$, which is 13 minutes after $C_a$ has fallen to zero (see point $x$); it is still 0.15% at time $t=104$, which is 40 minutes after $C_a$ is zero (see point $y$). This slow approach of $C_v$ to $C_s$ reduces the capability of the buffer vessel for equalizing a stream should another reactor be switched in during the first two hours.

Figure 4:
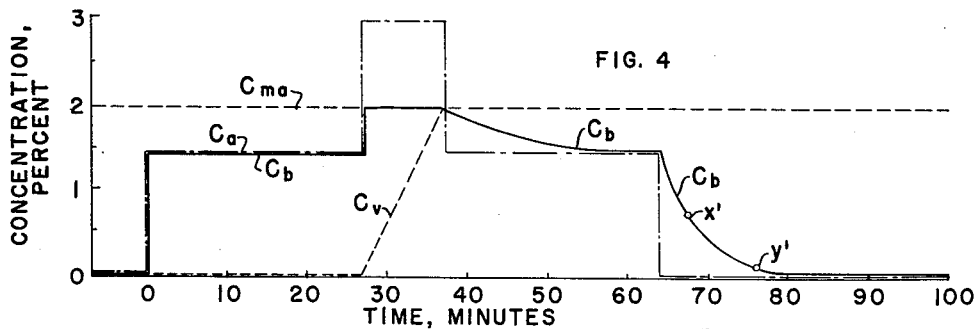
FIGURE 4 is a graph showing the behavior of the system of FIGURE 3.

In contrast, when the buffer vessel is operated according to the invention, as described above for FIGURE 3, the equalization can be achieved by a buffer vessel having a capacity of only 50 cubic meters, and recovery of the value $C_v$ toward the value $C_s$ is far more rapid, whereby the buffer vessel can better cope with a subsequent rise in $C_a$. This is shown in FIGURE 4 wherein the solid line again denotes $C_b$ and the value of $C_v$ prior to time $t=37$ is shown by a dotted line; after that time $C_b$ and $C_v$ are both indicated by the solid line. In this instance the total stream is by-passed until time $t=27$, whereby $C_b = C_a$; this is situation 3 in the table and $F=0$. At $t=27$ situation 1 occurs, and the valve 10 is opened progressively, whereby the composition $C_v$ rises linearly. At $t=37$ situation 5 is met, and the valve is positioned to make $F=1$. Not only is the equalizing action achieved by a vessel having under 30% of the volume required for the prior art practice, but the recovery of $C_v$ is more rapid; thus, this value falls to 0.75 and 0.15 at $t=67.5$ and $t=75.5$, respectively (see points $x'$ and $y'$), which are only 3.5 and 11.5 minutes, respectively, after $C_a$ has fallen to zero.

As was previously noted, the advantage according to the invention is brought about by two independent effects, viz., (a) flowing the source stream through the buffer vessel only when its composition or temperature exceeds the limits set and (b) flowing through the buffer vessel only as much of that stream as is required to bring $C_b$ to the exceeded limit. The contributions of these two effects may be seen with reference to the foregoing example by observing only (a) and setting the valve to $F=1$ at $t=27$, when situation 1 is reached. In this case the capacity of the buffer vessel must be 91 cubic meters.

Similar advantages are realized when the composition of the source stream varies according to a function other than the simple step function used in the example, as well as when $C_{mi}$ is not zero.

FIGURE 5 shows one form of regulator suitable to carry out the above-mentioned steps. Reference characters 10–15, 17–19, E, I, M, S and V denote parts previously described. The rectangles identified by the numbers 1 through 6 denote data comparators, each of which has an X-input and a Y-input and one or two output hubs H and/or L. Each of these comparators compares the signal received at the X-input thereof with that received at its Y-input; when the former is greater than the latter it emits a continuous electrical signal through its H-output, and when the former is lower than the latter it emits such a signal at its L-output. Such comparing devices are well known in electronic digital and analogue computers and need not be further described herein. It may be noted, however, that devices of this type are capable of comparing signals of various forms as previously stated. The reference numbers 7, 8 and 9, denote signal generators which may be manually or remotely set to generate signals representing the values of $C_{ma}$, $C_{mi}$ and $C_s$ which are, respectively, the upper and lower limits set for $C_b$ and the set point (or standard condition) of $C_v$. These signals are of the same form as those produced at 17, 18 and 19 and are applied to the Y-inputs of the comparators as follows: circuit 26 feeds the $C_{ma}$ signal to comparators 1 and 2, circuit 27 feeds the $C_{mi}$ signal to the comparators 3 and 4, and circuit 28 feeds the $C_s$ signal to the comparator 6. The signal denoting the condition $C_a$ is applied by a circuit 29 to the X-inputs of comparators 1, 3 and 5; the signal for $C_b$ is applied via a circuit 30 to the X-inputs of comparators 2 and 4; and the signal for $C_v$ is applied via circuit 31 to the X-input of comparator 6 and the Y-input of comparator 5. It will be noted that comparators 1 and 3 have only one output each. It is desirable that the remaining comparators do not emit any signal when the inputs thereto are equal.

The H-output from the comparator 1 is applied via circuit 32 to the relay-winding 33 of a first three-pole relay. The two make-contacts, co-operating with the upper armatures 34 and 35, are connected by circuits 36 and 37 to the H- and L-outputs, respectively, of comparator 2 whereby these signals can be transmitted only when the first comparator senses a high condition in its X-input (in other words, when $C_a$ is greater than $C_{ma}$). Similarly, the L-output comparator 3 is connected via circuit 38 to the winding 39 of a second three-pole relay; the two make-contacts, cooperating with the upper armatures 40 and 41, are connected by circuits 42 and 43 to the H- and L-outputs, respectively, of comparator 4. The upper armature 34 of the first relay is connected by a circuit 44 to the second armature 41 of the second relay and further, by circuit 45, to the winding 46 of a master control relay to be described. Similarly, the first armature 40 of the second relay is connected by a circuit 47 to the second armature 35 of the first relay and further by a circuit 48 to the winding 49 of a by-pass control relay.

The H-output of comparator 5 is connected by a circuit 50 to the winding 51 of a single-pole relay the make-contact of which is connected by a circuit 52 to the L-output of comparator 6. Similarly, the L-output of comparator 5 is connected by a circuit 53 to the winding 54 of another single-pole relay the make-contact of which is connected by a circuit 55 to the H-output of comparator 6. The armatures of the two last-mentioned relays are interconnected by a circuit 56 and further connected, by a circuit 57, to the winding 58 of the master control relay. This relay has an armature 59 which is in the non-operated position shown when neither winding 46 nor 58 is energized but which is operated when either winding is energized. This armature is connected by a circuit 60 to a source of electrical potential having a voltage and frequency (A.C. or D.C.) suitable for actuating the valve controller 61 to be described. The make-contact of the master relay is connected by a circuit 62 to the $t$-input terminal of the controller 61. The back-contact of this relay has two parallel connections to the $b$- terminal of the controller: firstly, through the make-contact of the by-pass control relay via circuits 63 and 64 and, secondly, via circuits 65, 66 and 67 which serially connect the back-contacts and third armatures 68 and 69 of the two first-mentioned relays.

The valve-operator 14 operates in response to a pneumatic or electrical signal generated by the controller 61 and transmitted to the operator by the line 15. (It should be noted that although a single rotary cock valve 10 was shown, a more complex valve system employing a plurality of individual control elements for performing jointly the identical function with greater precision could be used.) The controller 61 is of the type which varies the output signal in line 15 gradually and slowly (either in steps or continuously) so long as a signal is applied to its $b$- or its $t$-terminal and holds the valve stationary when neither terminal is energized. For example, when a signal is applied from the circuit 60 to the $b$-terminal (as would occur with the parts in the positions shown in the drawing), the valve 10 moves slowly to the position shown, wherein the total liquid stream from the pipe I by-passed the vessel, and stops in its extreme position with $F=0$. A signal applied to the $t$-terminal causes movement of the valve in the direction to increase F and, thereby, the flow in the through-flow pipe 11. When neither terminal receives a signal, the control signal in the line 15 remains constant and the valve 10 remains in its previously assumed position.

Operation of the control device is as follows: When the condition $C_a$ of the flowing stream is within the limits set (less than $C_{ma}$ and more than $C_{mi}$) relay windings 33 and 39 are not energized and no signals can flow through the circuits 45 and 48. Hence, only comparators 5 and 6 can exert control. Under these circumstances only one of the last four tabulated conditions can prevail, and it is then desired to flow liquid through the buffer vessel V only if the condition $C_v$ can thereby be made to approach $C_s$, in other words, when the output of comparator 5 is high and that of comparator 6 is low (condition 4) or when the output of comparator 5 is low and that of comparator 6 is high (condition 6). When the former combination of outputs prevails the circuits 50 and 52 are energized, and when the latter combination occurs the circuits 53 and 55 are energized; in either instance the circuit 57 is active to energize the winding 58, thereby operating the armature 59 of the master control relay and causing the controller input terminal $t$ to be energized via circuit 62. This causes the valve 10 to rotate until the total flow from the pipe I is through the vessel V and results in a gradual change in $C_v$ until either comparator 6 or 6 senses equal or reversed inputs (condition 3 or 6). This de-energizes the circuit 57 and the winding 58, causing the master control relay to drop out, thereby de-energizing circuit 62 and energizing the circuits 65, 66 and 67 through the closed third armatures 68 and 69 and thence circuit 64 to apply power to the controller terminal $b$. This causes the valve 10 to rotate to the position shown to by-pass the total flow.

When the condition $C_a$ falls outside the limits set at least some of the stream is passed through the vessel V. Thus, if $C_a$ is greater than $C_{ma}$ (condition 1), the circuit 32 is energized to operate the first-mentioned relay. Opening of the back-contact by the armature 68, and, hence, circuits 66 and 67 prevents power from reaching the controller terminal $b$ except via the circuit 63 as described later. Further, closing of the make-contacts against the armatures 34 and 35 connects the H- and L-outputs of comparator 2 to the windings 46 and 49, respectively. When $C_b$ exceeds $C_{ma}$ the H-output of comparator 2 emits a signal to the circuit 45: the winding 46 will therefore be energized to operate the master control relay and apply power via circuit 62 to the $t$-terminal, thereby increasing the through-flow via pipe 11. As soon as condition $C_b$ equals $C_{ma}$ (that is, when the output condition $C_b$ has fallen to become equal to the upper limit set) the comparator H-output 2 ceases to emit, thereby de-energizing the circuit 45; the master control relay therefore drops out and further movement of the valve 10 ceases. At this instant F has the value given in the table. Should $C_b$ fall below $C_{ma}$ the L-output of comparator 2 becomes active, and the circuits 37 and 48 become energized to energize the winding 49 and operate the by-pass relay. This applies power to the controller input terminal $b$ via circuits 63 and 64; the valve then rotates to reduce the flow in the pipe 11 and increase the by-pass flow until $C_b$ and $C_{ma}$ become equal, i.e. to bring F again to the tabulated value. The circuits 37, 48, 63 and 64 are then de-energized by cessation of the L-output of comparator 2, thereby stopping the valve movement.

Conversely, when $C_a$ is smaller than $C_{mi}$ (condition 2), the L-output of comparator 3 is active and the circuit 38 energizes the winding 39 to operate the second relay, thereby opening the circuit 67 through the armature 69 and connecting the H- and L-terminals of comparator 4 via circuits 48 and 45 to the windings 49 and 46, respectively. The action is similar to that just described, with the difference that comparator 4 now performs the functions previously performed by comparator 2.

It is evident that the control system of FIGURE 5 can be simplified by omitting certain parts in some applications. For example, when it is impossible for $C_a$ to fall below $C_{mi}$ (as is true when $C_{mi}$ is zero, as in the foregoing numerical example and in some other instances) $C_s$ will be set equal to $C_{mi}$. In such a case the comparators 3 and 4 and the generator 8, as well as the circuit elements controlled thereby (including the relay winding 39 and its armatures) may be omitted; the circuits 66 and 67 are then permanently interconnected. Because in this case $C_s$ is at the lower limit, comparator 6 can never emit an L-output; hence the comparator 6, the generator 9 and the circuit elements controlled thereby (including the relay windings 51 and 54 and their armatures) can also be omitted and the winding 58 can be energized directly from the L-output of comparator 5, from which the H-output connection can be omitted.

It should be noted that the foregoing specific embodiments are merely exemplary of a variety of control devices which can be used. For example, although FIGURES 3 and 5 showed a sensing or measuring device 18 for measuring $C_b$, it is evident from the foregoing table that the correct value of F, giving the position of the valve 10, can be determined without actually measuring $C_b$. Computers for such a determination, suitable for inclusion in the regulator R, are known or within the skill of the art and are, therefore, not further described.

I claim as my invention:

1. Method of equalizing fluctuations occurring in a condition of a source stream of material by means of a buffer vessel to produce an effluent stream wherein the condition in the effluent is kept within specified upper and lower limits, which method comprises the steps of: maintaining within a buffer vessel a body of said material having such properties that, when mixed with said source stream while said condition in said source stream is outside of said limits, the resultant mixture is within said limits; measuring said condition in at least one of said streams and in the said buffer vessel; (a) flowing at least a fractional part of said source stream through said vessel and by-passing the remainder thereof, if any, around said vessel when the condition of the said source stream is outside said limits, to produce an effluent stream containing said remainder and material discharged from said vessel in amount equal to said fractional part, said fractional part being sufficient to keep the condition of said effluent within said limits, (b) flowing at least a fractional part of said source stream through said vessel when the condition of the source stream deviates from the actual condition of the contents of the vessel in a direction opposite to the deviation of said actual condition from a predetermined standard condition for the said contents, and (c) by-passing said source stream around the vessel when the condition of said source stream deviates from said actual condition of the contents in the same direction as the deviation of said actual condition from said standard condition.

2. Method according to claim 1 wherein said fractional part which is flowed through the vessel in step (a) is essentially that required to make the condition of the effluent stream equal to the limit which was exceeded by the condition of the source stream.

3. Method according to claim 1 wherein the fluctuations in the condition of the source stream are such that both said limits can at different times be exceeded, and the said standard condition for the contents of the vessel is substantially midway between said limits.

4. Method according to claim 1 wherein the fluctuations in the condition of the source stream are such that only one of said limits can be exceeded, and the said standard condition for the contents of the vessel is substantially equal to the other of said limits.

5. Method of equalizing fluctuations occurring in a condition of a source stream of material by means of a buffer vessel to produce an effluent stream wherein the condition in the effluent stream is kept within specified upper and lower limits, which method comprises the steps of: maintaining within a buffer vessel a body of said material having such properties that, when mixed with said source stream while said condition in said source stream is outside of said limits, the resultant mixture is within said limits; measuring said condition in at least one of said streams and in the said buffer vessel; (a) flowing a fractional part of said source stream through said vessel and by-passing the remainder thereof around said vessel when the condition of the source stream is outside said limits to produce an effluent stream containing said remainder and material discharged from the vessel equal to said fractional part the said fractional part being such that the condition of said effluent is within the said limits and substantially at the limit which was exceeded by the condition of said source stream, (b) flowing the said source stream through said vessel when the condition of the source stream deviates from the actual condition of the contents of the vessel in a direction opposite to the deviation of said actual condition from a predetermined standard condition for said contents, and (c) by-passing said source stream around the vessel when the condition of said source stream deviates from said actual condition of the contents in the same direction as the deviation of said actual condition from said standard condition.

6. Buffer vessel apparatus for equalizing the fluctuation occurring in a condition of a source stream of material to produce an effluent stream wherein the condition in the effluent is kept within specified limits, said apparatus comprising: a buffer vessel for containing a body of said material with properties such that, when mixed with said source stream while said condition in said source stream is outside of said limits, the resultant mixture is within said limits; a supply pipe for said source stream; a by-pass pipe around said vessel; conduit and flow-control means for selectively feeding material from said supply pipe to said vessel or into said by-pass pipe; an outlet for said vessel; an effluent pipe connected to receive the combined flows from said vessel and by-pass pipe; means for measuring the said condition $C_a$ in one of said streams and the condition $C_v$ of the contents of said vessel; and means for positioning said flow-control means to vary the relative amounts of said source stream which are flowed through the said vessel and through said by-pass pipe.

7. The combination according to claim 6 wherein the said means for positioning said flow-control means includes a valve regulator operative to position the said flow-control means and signal-transmission means for transmitting the measured values of $C_a$ and $C_v$ to said regulator, said regulator including means for setting thereinto at least one of said specified limits and a standard value $C_s$ for the condition of the contents of the vessel, means for comparing $C_a$ with the said one limit, means responsive to said comparing means for increasing the flow of said source stream through the vessel when $C_a$ changes to exceed said limit and for decreasing said flow through the vessel when $C_a$ changes from a value outside said limit to a value within said limit, means for comparing $C_a$, $C_v$ and $C_s$, and means responsive to the last-named comparing means for (a) increasing the flow of said source stream through the vessel when $C_a$ deviates from $C_v$ in a direction opposite from the direction in which $C_v$ deviates from $C_s$ and (b) for increasing the said flow through the vessel when $C_a$ deviates from $C_v$ in the same direction as that in which $C_v$ deviates from $C_s$.

8. The combination according to claim 6 wherein the said means for positioning said flow-control means includes a valve regulator operative to position the said flow-control means and signal-transmission means for transmitting the measured values of $C_a$ and $C_v$ to said regulator, said regulator including means for setting thereinto at least one of said specified limits and a standard value $C_s$ for the condition of the contents of the vessel, means for comparing $C_a$ with the said one limit, means responsive to said comparing means for positioning the flow-control means so that, when $C_a$ exceeds said limit, the fractional part of the source stream which is passed through the vessel is such as to make the condition of said effluent stream substantially equal to said exceeded limit, means for comparing $C_a$, $C_v$ and $C_s$, and means responsive to the last-mentioned comparing means and operative when $C_a$ is within said limit for (a) positioning the flow-control means to pass said source stream through said vessel when $C_a$ deviates from $C_v$ in a direction opposite to the direction in which $C_v$ deviates from $C_s$ and (b) positioning the flow-control means to by-pass said source stream through said by-pass pipe when $C_a$ deviates from $C_v$ in the same direction as that in which $C_v$ deviates from $C_s$.

9. Buffer vessel apparatus for equalizing the fluctuations occurring in a condition of a source stream of material to produce an effluent stream wherein the condition in the effluent is kept within specified limits, said apparatus comprising: a buffer vessel for containing a body of said material with properties such that, when mixed with said source stream while said condition in said source stream is outside of said limits, the resultant mixture is within said limits; a supply pipe for said source stream connected to said vessel; an effluent pipe connected to said vessel; a by-pass pipe connected between said supply and effluent pipes; valve means for directing the flow of material from said supply pipe in varying proportions between said vessel and by-pass pipe; a valve regulator; a valve positioner for said valve means responsive to said valve regulator; means for measuring $C_v$, the condition of the contents of said vessel, $C_a$, the condition in the source stream, and $C_b$, the condition in the effluent stream; transmission lines from said measuring means for transmitting the measured values of $C_a$, $C_b$ and $C_v$ to said regulator; means for setting into said regulator at least one of said specified limits and the value of $C_s$, a predetermined standard condition for the said contents of the vessel; said regulator including means for comparing $C_a$, $C_b$ and said limit; means responsive to said comparing means for positioning the valve means so that, when $C_a$ exceeds said limit, the fractional part of the source stream which is passed through the vessel is substantially that to make $C_b$ equal to the said limit, means for comparing $C_a$, $C_v$ and $C_s$, and means responsive to the last-mentioned comparing means and operative when $C_a$ is within said limit for (a) positioning the valve means to pass said source stream through said vessel when $C_a$ deviates from $C_v$ in a direction opposite to the direction in which $C_v$ deviates from $C_s$ and (b) positioning the valve means to by-pass said source stream through said by-pass pipe when $C_a$ deviates from $C_v$ in the same direction as that in which $C_v$ deviates from $C_s$.

10. Buffer vessel apparatus for equalizing the fluctuations occurring in a condition $C_a$ of a source stream of material to produce an effluent stream wherein the condition in the effluent $C_b$ is kept within specified limits, said apparatus comprising: a buffer vessel for containing a body of said material; a supply pipe for said source stream connected to said vessel; an effluent pipe connected to said vessel; a by-pass pipe connected between said supply and effluent pipes; valve means for directing the flow of material from said supply pipe in varying proportions between said vessel and by-pass pipe; a valve regulator; a valve positioner for said valve means responsive to said valve regulator; means for measuring $C_v$, the condition of the contents of said vessel, $C_a$ and $C_b$; transmission lines from said measuring means for transmitting the measured values of $C_a$, $C_b$ and $C_v$ to said regulator; means for setting into said regulator the said specified limits and the value of $C_s$, a predetermined standard condition for the said contents of the vessel; said regulator including means for comparing $C_a$, $C_b$ and said limits; means responsive to said comparing means for positioning the valve means so that, when $C_a$ exceeds either of said limits, the fractional part of the source stream which is passed through the vessel is substantially that to make $C_b$ equal to the exceeded limit, means for comparing $C_a$, $C_v$ and $C_s$, and means responsive to the last-mentioned comparing means and operative when $C_a$ is within the said limits for (a) positioning the valve means to pass said source stream through said vessel when $C_a$ deviates from $C_v$ in a direction opposite to the direction in which $C_v$ deviates from $C_s$ and (b) positioning the valve means to by-pass said source stream through said by-pass pipe when $C_a$ deviates from $C_v$ in the same direction as that in which $C_v$ deviates from $C_s$.

References Cited in the file of this patent
UNITED STATES PATENTS 2,508,170     Kaufman _____ May 16, 1950